United States Patent
Dusserre-Telmon et al.

(10) Patent No.: US 7,040,811 B2
(45) Date of Patent: May 9, 2006

(54) OIL-DAMPED SEALED ROLLING BEARING

(75) Inventors: Guy Dusserre-Telmon, Sivry-Courtry (FR); Daniel Plona, Vulaines sur Seine (FR)

(73) Assignee: Snecma Moteurs, Paris (FR)

( * ) Notice: Subject to any disclaimer, the term of this patent is extended or adjusted under 35 U.S.C. 154(b) by 463 days.

(21) Appl. No.: 10/462,639

(22) Filed: Jun. 17, 2003

(65) Prior Publication Data

US 2004/0022463 A1   Feb. 5, 2004

(30) Foreign Application Priority Data

Jun. 20, 2002 (FR) .................................. 02 07613

(51) Int. Cl.
*F16C 33/58* (2006.01)
*F16C 27/00* (2006.01)

(52) U.S. Cl. ......................................... 384/99; 384/475
(58) Field of Classification Search ................... 384/99, 384/462, 473–475, 535, 581
See application file for complete search history.

(56) References Cited

U.S. PATENT DOCUMENTS

| | | | |
|---|---|---|---|
| 3,836,215 A * | 9/1974 | Dopkin et al. ................. | 384/99 |
| 4,527,912 A * | 7/1985 | Klusman ..................... | 384/99 |
| 5,253,985 A * | 10/1993 | Ruetz .......................... | 384/99 |
| 5,749,660 A * | 5/1998 | Dusserre-Telmon et al. ..... | 384/475 |
| 5,807,070 A * | 9/1998 | Bock ........................... | 384/99 |
| 6,261,003 B1 * | 7/2001 | Dusserre-Telmon et al. ..... | 384/475 |

FOREIGN PATENT DOCUMENTS

EP        0 769 631 A1     4/1997

OTHER PUBLICATIONS

U.S. Appl. No. 10/671,742, filed Sep. 29, 2003, Dusserre-Telmon et al.
U.S. App. No. 10/462,639, filed Jun. 17, 2003, Dusserre-Telmon et al.

* cited by examiner

*Primary Examiner*—Thomas R. Hannon
(74) *Attorney, Agent, or Firm*—Oblon, Spivak, McClelland, Maier & Neustadt, P.C.

(57) ABSTRACT

A rolling bearing defines a separation between an oil enclosure and an air enclosure. The bearing includes rolling elements defining a first side opening and a second side opening, and includes an annular junction piece having an annular contact surface with the structural piece. An oil film is disposed at the annular contact surface between the structural piece and the junction piece and is laterally defined by at least two sealing rings. A sealing device covers at least part of the first side opening. A first oil circulation device feeds the oil film with oil and feeds the rolling elements beside the oil enclosure with oil from the oil film. A second oil circulation device, independent of the first, recovers the oil used for lubricating the rolling elements and is arranged in such a manner as to avoid oil flowing towards the air enclosure.

13 Claims, 3 Drawing Sheets

OIL-DAMPED SEALED ROLLING BEARING

FIELD OF THE INVENTION

The present invention relates to a sealed rolling bearing having balls or rollers provided with a film of oil under pressure of the "squeeze film" type, and that is intended for use in particular in the field of aviation.

BACKGROUND OF THE INVENTION

Rolling bearings are commonly used in the field of aviation. Typically, aviation turbomachines such as gas turbine engines use rolling bearings for supporting rotary shafts inside a structural piece. The rolling bearings are essentially constituted by balls or rollers retained in races formed by outer and inner bearing rings. In an aviation turbomachine, ball bearings are generally used for holding axial loads and roller bearings for holding radial loads in the turbomachine.

It is known to use oil to lubricate and to cool rolling bearings in a turbomachine. Given the heating of the turbomachine and the high speed of rotation of its shafts, simple lubrication by injecting oil only during maintenance of the turbomachine is not sufficient. It is therefore necessary to have recourse to "dynamic" lubrication of the rolling bearings. Dynamic lubrication consists in causing the oil to circulate continuously around a feed circuit. Oil is thus injected between the rings of the bearings and subsequently leaves the bearings, thereby extracting the heat produced in such bearings. The oil is then filtered and de-aired so as to separate out air from the oil. An oil enclosure and an air enclosure supporting the rolling bearings enable a closed environment to be provided so as to ensure that lubricating oil does not escape into the engine proper.

Dynamically lubricating rolling bearings as described above presents the major drawback of requiring an oil circulation circuit to be provided that includes recovery scoops, feed pipes, and a pump, thereby increasing the weight of the turbomachine. Providing oil and air enclosures also contributes to increasing the weight of the machine.

In order to reduce the size of such enclosures, patent EP 0 769 631 proposes a ball or roller bearing that makes use of the dynamic energy created by rotation of the shaft supported by the balls or the rollers in order to drain the lubricating oil. A drainage circuit is provided via orifices for draining the lubricating oil that are formed through one of the rings of the bearing. That type of drained rolling bearing enables a major portion of the lubricating oil to be recovered.

It is also known to provide rolling bearings with oil films of the "squeeze film" type in order to reduce the vibration generated by the high speed of rotation of the turbomachine shafts supported by the rolling bearings. Typically, oil under pressure is confined between the outer bearing ring and a structural piece of the bearing. At the contact surface between the ring and the structural piece, the oil under pressure thus acts as a damper. In general, oil-damped bearings of this kind are sealed by means of annular gaskets interposed between the outer bearing ring and the structural piece. The oil film is thus defined between two sealing gaskets.

Nevertheless, that type of oil-damped bearing presents a problem of leaktightness. It is found in practice that the oil confined between the two sealing gaskets tends to flow outside the oil film. The presence of the sealing gaskets does not enable such leaks to be avoided. In particular, oil flows appear not only beside the oil enclosure, which is acceptable, but also beside the air enclosure. Such flows beside the air enclosure are particularly harmful to proper operation of the turbomachine.

OBJECT AND SUMMARY OF THE INVENTION

The present invention thus seeks to mitigate such a drawback by proposing a sealed rolling bearing provided with an oil-damped bearing having particular circuits for feeding and recovering lubricating oil making it possible to provide better sealing beside the air enclosure. Another object of the invention is to simplify the provision of oil enclosures in order to reduce overall cost and weight.

To this end, the invention provides a rolling bearing for supporting a shaft in rotation inside an annular structural piece, said bearing defining a separation between an oil enclosure and an air enclosure, and comprising: a plurality of rolling elements engaged between an inner bearing ring and an outer bearing ring and defining a first side opening beside said air enclosure and a second side opening beside said oil enclosure; at least one annular junction piece mechanically connected to said outer bearing ring and having an annular contact surface with said structural piece; an oil film disposed at said annular contact surface between said structural piece and said junction piece and laterally defined by at least two sealing rings; and sealing means covering at least part of said first side opening beside said air enclosure; the bearing further comprising: first oil circulation means for feeding said oil film with oil and for feeding said rolling elements beside said oil enclosure with oil from said oil film in order to lubricate them; and second oil circulation means, independent of the first, for recovering the oil that has been used for lubricating said rolling elements, said second oil circulation means being arranged in such a manner as to avoid oil flowing towards said air enclosure.

As a result, the two independent oil circulating means serve both to drain lubricating oil from the rolling elements and, beside the air enclosure, to drain leaks coming from the oil film. The rolling bearing is sealed beside the air enclosure firstly by the sealing means and secondly by the oil circulation means which enable the major part of the oil that has been used for lubricating the rolling elements to be recovered. The leaktight nature of the rolling bearing then makes it possible to simplify the way in which the air and oil enclosures are embodied.

Preferably, the first oil circulation means comprise: at least one first feed duct passing through said structural piece and opening out between said sealing rings to said annular contact surface in order to feed said oil film with oil; and at least one second feed duct passing through said junction piece and opening out at said annular contact surface between said sealing rings.

The second feed duct opens out towards the means for feeding oil to the rolling elements, preferably via at least one annular groove formed in the junction piece, thereby enabling the rolling elements to be lubricated. Said means may include a nozzle plate disposed beside the second side opening beside the oil enclosure.

Advantageously, the second oil circulation means comprise: at least one first recovery duct passing through said outer bearing ring and opening out at said rolling elements; at least one second recovery duct formed in said junction piece, said second duct communicating with said first recovery duct and opening out into said annular contact surface away from said oil film beside said air enclosure; and at least one third recovery duct passing through said structural piece, said third recovery duct opening out to said annular contact surface outside said oil film beside said air enclosure and opening out to oil pumping means. The pumping means enable the oil that has been used for lubricating the rolling elements to be recovered so as to be filtered prior to being reinjected into the rolling bearing via the first oil circulation means.

An additional sealing ring may also be provided at the annular contact surface and beyond the second and third recovery ducts, beside the air enclosure. This additional sealing ring is optional if the pumping means provide a delivery rate that is sufficiently large.

The sealing means may include a sealing plate fixed to the outer bearing ring and extended by a free end towards the inner bearing ring, or else a sealing plate integral with the outer bearing ring and extended towards the inner bearing ring by at least one brush gasket.

The rolling elements may be constituted by balls or by rollers.

BRIEF DESCRIPTION OF THE DRAWINGS

Other characteristics and advantages of the present invention appear from the following description made with reference to the accompanying drawings which show embodiments that have no limiting character. In the figures.

DETAILED DESCRIPTION OF AN EMBODIMENT

Figure 1:
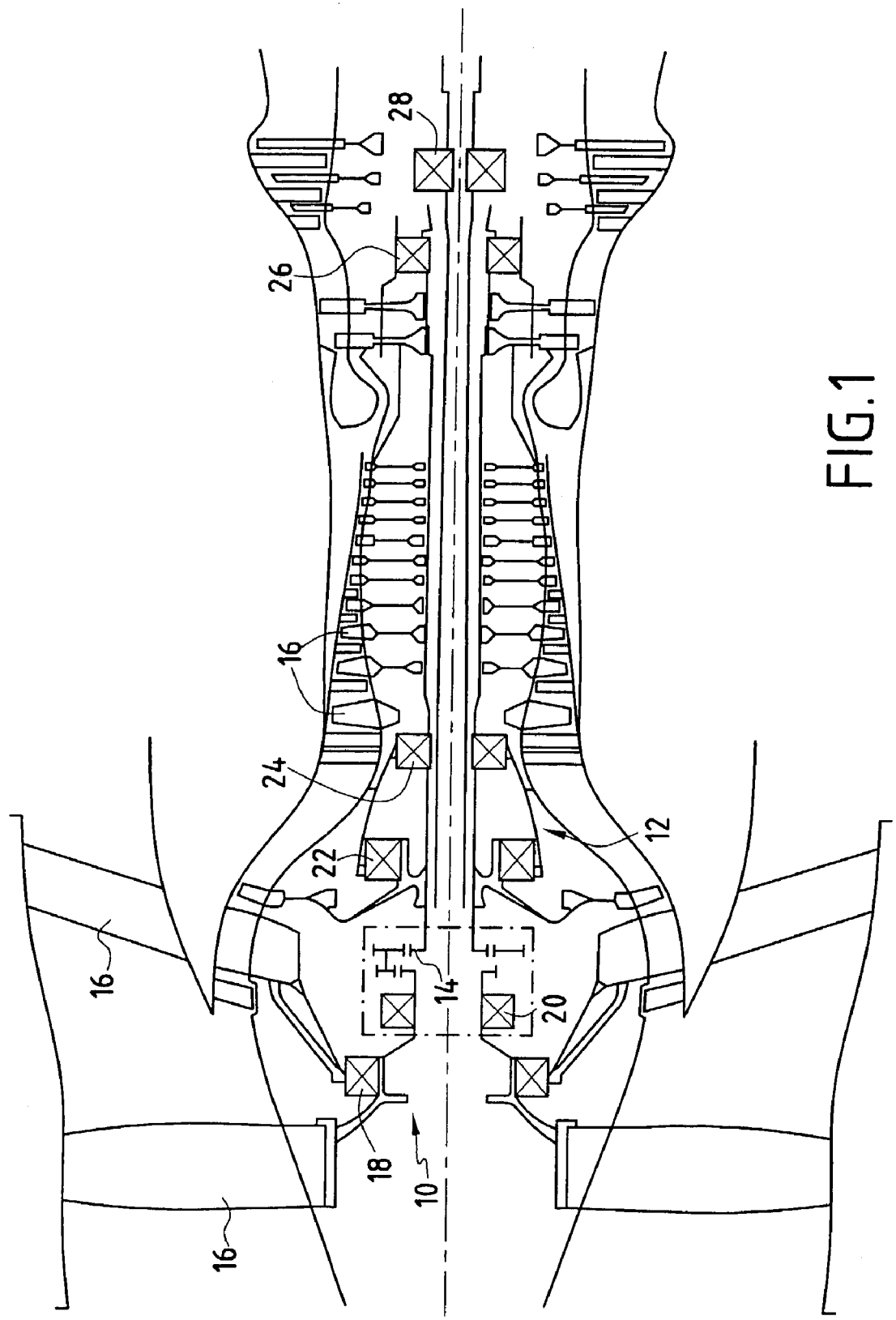
FIG. 1 is a diagrammatic longitudinal section view of a turbojet showing the locations of the various rolling bearings.

FIG. 1 is a longitudinal section of a turbojet. The turbojet is constituted in particular by a front shaft 10 and a rear shaft 12 that are coaxial and connected together by a gearbox 14. The shafts 10 and 12 carry compressor and turbine blades 16 and cause them to rotate at different speeds because of the gearbox 14. In order to withstand the radial and axial loads, the shafts 10 and 12 are supported by rolling bearings. Thus, the front shaft 10 is supported by a ball bearing 18 (for withstanding axial loads) and by a roller bearing 20 (for withstanding radial loads) disposed in the gearbox 14. Similarly, the rear shaft 12 is supported at a front end by ball bearings 22 and 24 and at its opposite end by roller bearings 26 and 28.

Figure 2:
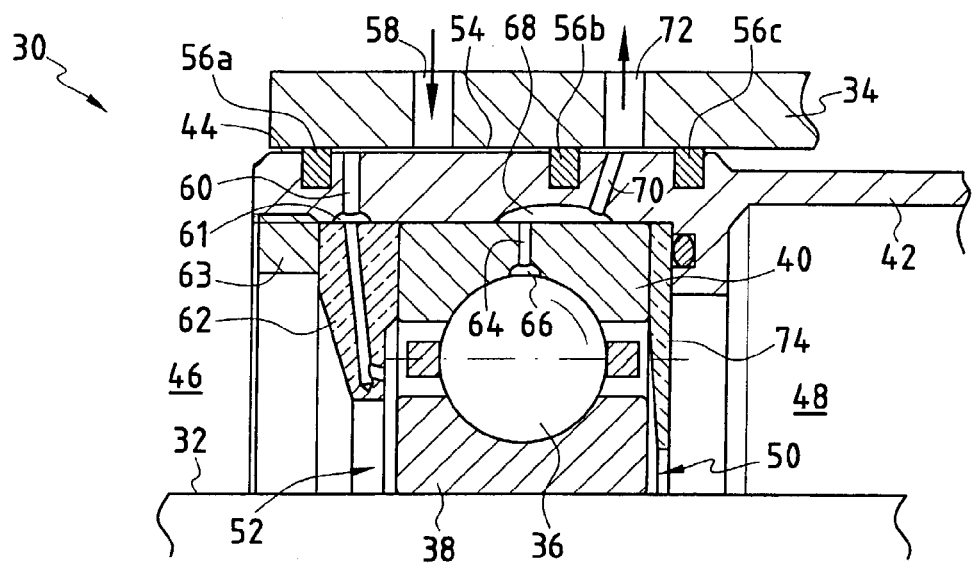
FIG. 2 shows a ball bearing of the invention in greater detail.

Reference is now made to FIG. 2 which shows a particular embodiment of a ball bearing 30 of the invention in greater detail. By way of example, this bearing may replace the above-described ball bearings 18, 22, and 24.

The ball bearing 30 is placed between a shaft 32 and an annular structural piece 34. Typically, the bearing 30 has a plurality of balls 36 engaged between the inside faces of an inner bearing ring 38 and an outer bearing ring 40 forming races for retaining the balls. A junction piece 42 which is likewise annular is interposed between the outer bearing ring 40 and the structural piece 34.

More precisely, this junction piece 42 is mechanically connected to an outside face of the outer bearing ring 40 and presents an annular contact surface 44 with the structural piece 34. The bearing thus defines a separation between an "oil" enclosure 46 and an "air" enclosure 48. In addition, the balls engaged between the rings 38 and 40 define a first side opening 50 beside the air enclosure 48 and a second side opening 52 beside the oil enclosure 46.

In order to damp the forces transmitted from the shaft 32 to the outer structural piece 34, the ball bearing is provided with a film of oil 54. This damper-forming oil film 54 is located at the annular contact surface 44 between the structural piece 34 and the junction piece 42, and it is defined laterally by two sealing rings 56a and 56b. These sealing rings 56a and 56b are placed in respective annular grooves (no reference) machined in the junction piece 42 in its contact surface 44 with the structural piece 34. The oil film 54 is thus confined between these two sealing rings 56a and 56b.

In the invention, first oil circulation means serve in particular to feed the oil film 54 with oil. To do this, at least one first feed duct 58 passes through the structural piece 34 and opens out between the two sealing rings 56a and 56b to the contact surface 44 between the structural piece 34 and the junction piece 42. Upstream from the oil film 54, this first feed duct 58 is connected to pipework (not shown in the figures) leading to a conventional lubrication installation having a pump and an oil tank enabling it to circulate oil.

At least one second feed duct 60 passes through the junction piece 42 and also opens out between the two sealing rings 56a and 56b to the oil film 54. This second feed duct 60 preferably opens out via at least one annular groove 61 formed in the junction piece 42 leading to means for feeding oil to the balls 36 so as to ensure that the balls are lubricated from the oil film 54. The means for feeding the balls with oil may comprise, for example, a nozzle-forming side plate 62 placed level with the second side opening 52 beside the oil enclosure 46. As shown in FIG. 2, the nozzle-forming side plate 62 is held against the outer bearing ring 40 by a threaded fixing ring 63 and it extends towards the inner bearing ring 38. It thus serves to inject oil directly at ball level.

Second oil circulation means, independent of the first serve to recover the oil that has been used to lubricate the balls 36. At least one first recovery duct 64 passes through the outer bearing ring 40 and opens out level with the balls 36, preferably via at least one annular groove 66 formed in the outer bearing ring. In addition, this first recovery circuit 64 advantageously also opens out into an annular collector groove 68 formed in the junction piece 42. At least one second recovery duct 70 made in the junction piece 42 opens out into the annular collector groove 68 and into the contact surface 44 between the structural piece 34 and the junction piece 42, away from the oil film 54, beside the air enclosure 48. In addition, at least one third recovery duct 72 is formed in the structural piece 34. This third recovery duct 72 passes through this piece and opens out into the contact surface 44 between the structural piece 34 and the junction piece 42 outside the oil film 54, beside the air enclosure 48. This duct 72 is connected to pipework leading to the conventional lubricating installation serving in particular to recover the oil that has been used for lubricating the balls 36 by using the pump. It is also possible for the air coming from the air enclosure 48 to be sucked in and recovered by the pump of the lubricating installation. In this case, an oil de-aerating device (not shown in the figures) needs to be provided in the lubricating installation in order to separate the air from the recovered oil.

In order to make the ball bearing 30 leaktight beside the air enclosure 48, sealing means cover at least a fraction of the first side opening 50. As shown in FIG. 2, these sealing means may be constituted by a side plate 74 fixed at one end to the outer bearing ring 40 and extending at its opposite, free end, towards the inner bearing ring 38.

An additional sealing ring 56c may be provided level with the contact surface 44 between the structural piece 34 and the junction piece 42 beyond the second and third recovery ducts 70 and 72, beside the air enclosure 48. This additional sealing ring 56c serves to prevent oil flowing towards the air enclosure 48. Nevertheless, this additional sealing ring 56c is not essential if the flow rate of the pump in the lubricating installation is sufficient to prevent oil from flowing towards the air enclosure.

Figure 3:
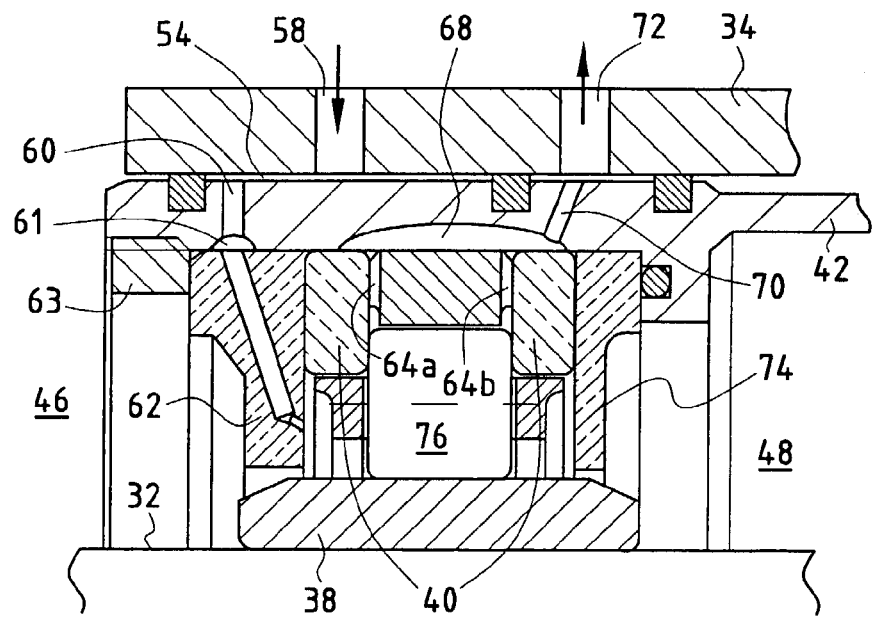
FIG. 3 shows a roller bearing of the invention.

Reference is now made to FIG. 3 which shows a roller bearing 76 of the invention. By way of example, this bearing may replace the above-described roller bearings 20, 26, and 28. The roller bearing has the same oil circulating means as those described for the ball bearing. Nevertheless, the second oil circulation means shown include at least two first recovery ducts 64a and 64b formed in the outer bearing ring 40 and opening out into an annular groove 68 formed in the junction piece 42. The sealing means beside the air enclosure are likewise constituted by a side plate 74 fixed to the outer bearing ring 40.

Figure 4:
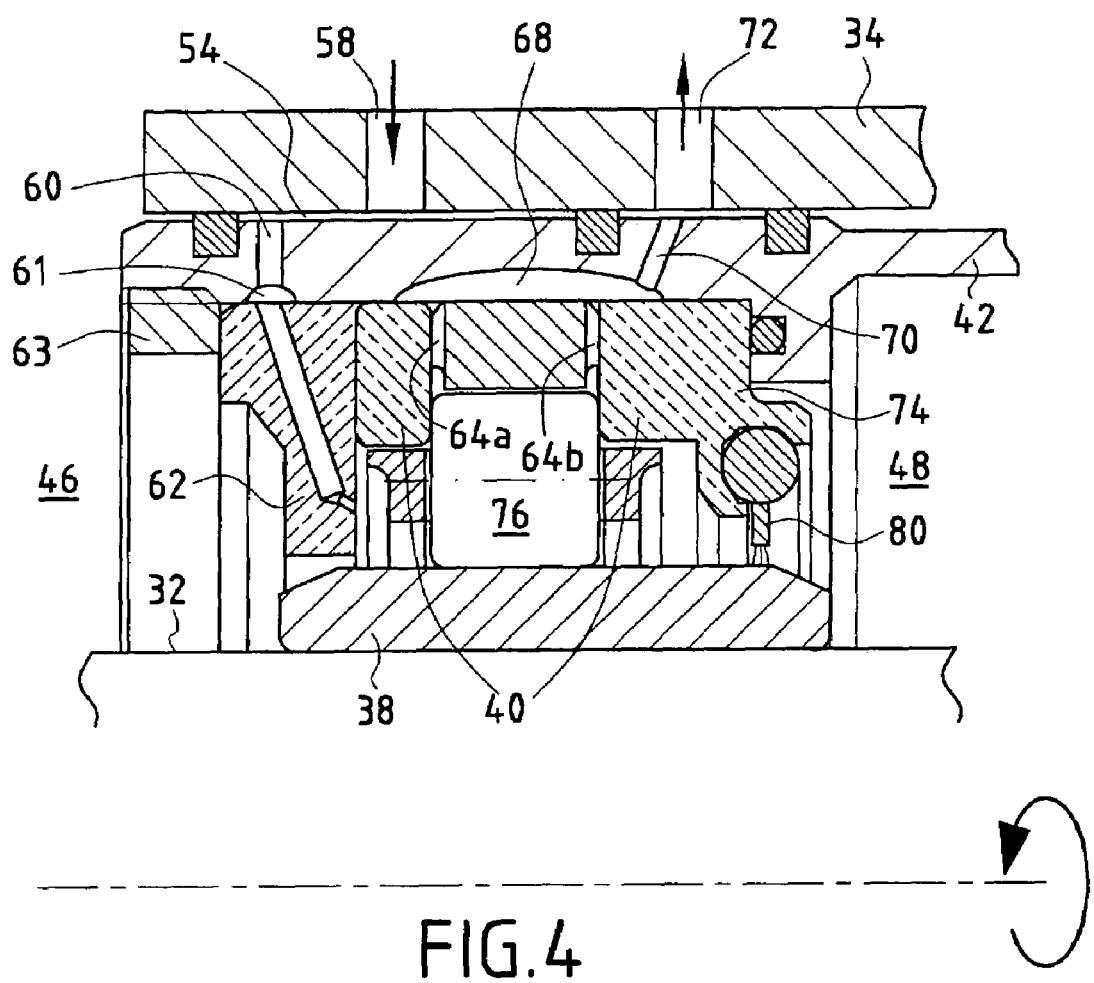
FIG. 4 shows a roller bearing in a variant of the invention.

FIG. 4 shows another roller bearing 76 of the invention. In this embodiment, the sealing means beside the air enclosure are constituted by a sealing side plate 74 integral with the outer bearing ring 40 and extend towards the inner bearing ring 38 via at least one brush gasket 80. The oil circulation means are identical to those of the roller bearing of FIG. 3.

What is claimed is:

1. A rolling bearing for supporting a shaft in rotation inside an annular structural piece, said bearing defining a separation between an oil enclosure and an air enclosure, and comprising:
    a plurality of rolling elements engaged between an inner bearing ring and an outer bearing ring and defining a first side opening beside said air enclosure and a second side opening beside said oil enclosure;
    at least one annular junction piece mechanically connected to said outer bearing ring and having an annular contact surface with said structural piece;
    an oil film disposed at said annular contact surface between said structural piece and said junction piece and laterally defined by at least two sealing rings; and
    sealing means covering at least part of said first side opening beside said air enclosure;
    the bearing further comprising:
    first oil circulation means for feeding said oil film with oil and for feeding said rolling elements beside said oil enclosure with oil from said oil film in order to lubricate them; and
    second oil circulation means, independent of the first, for recovering the oil that has been used for lubricating said rolling elements, said second oil circulation means being arranged in such a manner as to avoid oil flowing towards said air enclosure.

2. A bearing according to claim 1, wherein said first oil circulation means comprise:
    at least one first feed duct passing through said structural piece and opening out between said sealing rings to said annular contact surface in order to feed said oil film with oil; and
    at least one second feed duct passing through said junction piece and opening out at said annular contact surface between said sealing rings.

3. A bearing according to claim 2, wherein said second feed duct opens out towards the means for feeding said rolling elements with oil enabling said rolling elements to be lubricated.

4. A bearing according to claim 3, wherein said feed means include a nozzle-forming side plate disposed at said second side opening beside said oil enclosure.

5. A bearing according to claim 2, wherein said second feed duct opens out into at least one annular groove formed in said junction piece.

6. A bearing according to claim 1, wherein said second oil circulation means comprise:
    at least one first recovery duct passing through said outer bearing ring and opening out at said rolling elements;
    at least one second recovery duct formed in said junction piece, said second duct communicating with said first recovery duct and opening out into said annular contact surface away from said oil film beside said air enclosure; and
    at least one third recovery duct passing through said structural piece, said third recovery duct opening out to said annular contact surface outside said oil film beside said air enclosure and opening out to oil pumping means.

7. A bearing according to claim 6, further comprising an additional sealing ring disposed at said annular contact surface beyond said second and third recovery ducts beside said air enclosure.

8. A bearing according to claim 6, wherein said first recovery duct opens out to said rolling elements via at least one annular groove formed in said outer bearing ring.

9. A bearing according to claim 6, wherein said first and second recovery ducts communicate with each other via at least one annular groove formed in said junction piece.

10. A bearing according to claim 1, wherein said sealing means comprise a sealing side plate sided to said outer bearing ring and extending via a free end towards said inner bearing ring.

11. A bearing according to claim 1, wherein said sealing means comprise a sealing side plate integral with said outer bearing ring and extending towards said inner bearing ring via at least one brush gasket.

12. A bearing according to claim 1, wherein said rolling elements are balls.

13. A bearing according to claim 1, wherein said rolling elements are rollers.

* * * * *